United States Patent
Neuhäusser

(10) Patent No.: US 10,955,804 B2
(45) Date of Patent: Mar. 23, 2021

(54) CHECKING A FUNCTIONAL MODULE OF AN AUTOMATION INSTALLATION

(71) Applicant: SIEMENS AKTIENGESELLSCHAFT, München (DE)

(72) Inventor: Martin Richard Neuhäusser, Nuremberg (DE)

(73) Assignee: Siemens Aktiengesellchaft, Munich (DE)

( * ) Notice: Subject to any disclaimer, the term of this patent is extended or adjusted under 35 U.S.C. 154(b) by 572 days.

(21) Appl. No.: 15/537,264

(22) PCT Filed: Dec. 17, 2014

(86) PCT No.: PCT/EP2014/078278
§ 371 (c)(1),
(2) Date: Jun. 16, 2017

(87) PCT Pub. No.: WO2016/095993
PCT Pub. Date: Jun. 23, 2016

(65) Prior Publication Data
US 2017/0351238 A1    Dec. 7, 2017

(51) Int. Cl.
*G05B 19/042* (2006.01)
*G05B 19/418* (2006.01)

(52) U.S. Cl.
CPC ... *G05B 19/0428* (2013.01); *G05B 19/41885* (2013.01); *G05B 2219/23006* (2013.01)

(58) Field of Classification Search
CPC .......... G05B 19/0428; G05B 19/41885; G05B 2219/23006
See application file for complete search history.

(56) References Cited

U.S. PATENT DOCUMENTS 5,992,229 A * 11/1999 Pyotsia ............... F16K 37/0083
                                                                  700/282
6,047,220 A *  4/2000 Eryurek ............. G05B 13/0285
                                                                  700/10
(Continued)

FOREIGN PATENT DOCUMENTS

CN          1997909 A     7/2007
CN        101828154 A     9/2010
(Continued)

*Primary Examiner* — Robert E Fennema
*Assistant Examiner* — Christopher W Carter
(74) *Attorney, Agent, or Firm* — Henry M. Feiereisen LLC

(57) ABSTRACT

The invention relates to a method for checking a compatibility of a functional module for an installation for process automation. An input specification is provided for an input interface of the functional module, the input specification indicating for an input signal all input values that the functional module respectively accepts as valid. An output specification is provided, the output specification indicating for an output signal of the functional module all output values that the functional module provides as intended when the input specification is fulfilled. Operation of the functional module on the installation is preceded by an analysis device checking whether the functional module produces, for each input signal produced on the input interface in accordance with the input specification, the output signal on an output interface in accordance with the output specification. When an output value of the output signal violates the output specification, a module error is signaled.

4 Claims, 4 Drawing Sheets

(56) References Cited

U.S. PATENT DOCUMENTS

| | | | | |
|---|---|---|---|---|
| 6,675,240 B1* | 1/2004 | Ludtke | ............... | G06F 9/44521 370/463 |
| 2005/0164684 A1* | 7/2005 | Chen | ............... | G05B 19/0423 455/414.1 |
| 2008/0222662 A1* | 9/2008 | Gunzert | ............. | G05B 19/0428 719/321 |
| 2010/0211361 A1* | 8/2010 | Stolper | ............. | G05B 19/0426 703/1 |
| 2010/0287379 A1 | 11/2010 | Wittmer et al. | | |
| 2011/0015890 A1 | 1/2011 | Yamashita et al. | | |
| 2013/0253671 A1 | 9/2013 | Torigoe | | |
| 2013/0326212 A1* | 12/2013 | Schultz | ............... | H04L 63/126 713/152 |

FOREIGN PATENT DOCUMENTS

| | | | | |
|---|---|---|---|---|
| CN | 102495557 A | 6/2012 | | |
| CN | 103324156 A | 9/2013 | | |
| DE | 4332895 | * | 5/1995 | ............ G05B 19/05 |
| DE | 4332895 C1 | 5/1995 | | |
| EP | 2237123 | * | 10/2010 | ........... G05B 19/418 |
| EP | 2237123 A1 | 10/2010 | | |
| EP | 2645190 A2 | 10/2013 | | |

* cited by examiner

CHECKING A FUNCTIONAL MODULE OF AN AUTOMATION INSTALLATION

CROSS-REFERENCES TO RELATED APPLICATIONS

This application is the U.S. National Stage of International Application No. PCT/EP2014/078278, filed Dec. 17, 2014, which designated the United States and has been published as International Publication No. WO 2016/095993.

BACKGROUND OF THE INVENTION

The invention relates to a method for checking a compatibility of a functional module that is intended for an installation for process automation. The functional module is provided for communicating with the installation via an input interface and an output interface. The functional module uses the input interface to receive at least one input signal and uses the output interface to output at least one output signal. There needs to be a check to determine whether the functional module produces output signals suitable for the installation and whether the installation can supply the functional module with correct, input signals. The invention also includes an engineering system for performing the method.

In an installation for process automation, or an automation installation for short, the regulation or control of a process can be performed on the basis of programmable logic controllers (PLCs). For a programmable logic controller to carry out the respectively required correct control steps or regulation steps, the programmable logic controller is configured or parameterized or planned by means of a control program. This control program can be provided by a functional block or multiple functional blocks. As an alternative to programmable controllers, it is also possible for dedicated control circuits to be provided.

The text below refers to a functional block and a functional circuit consistently by "functional module".

Each functional module implements a specific functionality by reading in at least one input signal that is respectively described by a temporal sequence of input values. The at least one input signal is used to compute at least one output signal, which in turn represents a respective temporal sequence of output values. By way of example, a functional module for controlling a drive for a conveyor belt can receive firstly the conveying speed and secondly the operating status of a conveyor belt connected upstream or positioned upstream in a conveying installation as input signals and adapt the conveying speed of its own conveyor belt accordingly as an output signal.

To equip an installation with suitable functional modules, there is an interest, for economic reasons, in continuing to use functional modules that have already been developed to completion and that were originally intended for other installations. In particular, it is also advantageous to be able to accept functional modules from other manufacturers, for example the manufacturer of the respective installation component to be controlled, so that one's own development work is dropped completely.

The reuse of functional modules or the use of other functional modules has been found to be a source of error for the configuration or planning of an installation. By way of example, an older functional module may have been developed on different assumptions. The described functional module for controlling the conveyor belt can, by way of example, provide a maximum speed that is lower than the actually available maximum speed for the conveyor belt that is currently to be controlled, which may have a more powerful motor, for example. Such a limitation cannot be discovered until the functional module is used in the new installation, however, and then only under extreme conditions.

Sometimes, the incorrectly configured maximum speed is not discovered until in a productive mode and can result in damage to the installation or the goods being produced.

A second source of error is the coding of the input signals and output signals, which coding can change as a result of further development of the hardware. By way of example, in an old conveyor belt system, there may be provision for stoppage of the conveyor belt to be signaled by a negative input value for the conveying speed. In a more modern conveyor belt, both a positive and a negative conveying speed may be possible, for example because the drive can move the conveyor belt in the opposite direction too. If a functional module were now to receive an input signal having negative input values, then this would result in a misinterpretation of the installation state.

Acceptance of a functional module from another manufacturer entails the additional risk that the functional module can be tested only on a random basis, since normally the actual programming, that is to say the source code, is not visible. In this case, it is necessary to rely on the information from the manufacturer. There is also then no guarantee of whether the manufacturer has also actually checked the functional module for all possible input values.

SUMMARY OF THE INVENTION

The invention is based on the object of being able to check a functional module for an installation for process automation to determine whether it can behave in a manner compatible with the requirements that it needs to meet in the installation.

The object is achieved by the subjects of the independent patent claims. Advantageous developments of the invention arise as a result of the features of the dependent patent claims.

The invention provides a method for checking a compatibility of a functional module for an installation for process automation. The method assumes that the functional module is designed to use an input interface to receive at least one input signal from the installation and to take the at least one input signal as a basis for producing at least one output signal and to output the at least one output signal produced to the installation using an output interface. The functional module may be, by way of example, a control circuit or a function block, e.g. for configuring a programmable logic controller. A function block is thus a program code.

In a first method step, the method provides for an input specification to be provided for the input interface, which input specification indicates for the at least one input signal, that is to say a speed signal and/or a temperature signal, for example, all input values that the functional module respectively accepts as valid. In other words, the input specification describes all states of the at least one input signal for which the functional module is designed. If the functional module does not provide for a negative speed statement to be processed, for example, then the input specification can indicate "speed" for an input signal, so that only input values greater than and equal to zero are thus provided.

In a further method step, an output specification is provided for the output interface. The output specification indicates for the at least one output signal all output values that the functional module respectively provides as intended when the input specification is fulfilled. In other words, the output specification describes for the at least one output signal which respective output values should or can arise if the functional module is operated only with the admissible input values and the functional module works correctly. There does not need to be an accurate value association, that is to say that the output value provided in accordance with the function does not need to be associated with a particular input value. There may be respective value range statements for the input specification and the output specification. However, the output specification can also have a formula whose variables are formed by the input values.

In a further method step, operation of the functional module in the installation, that is to say in a module test, is preceded by an analysis device checking whether the functional module also actually produces, for each input signal produced on the input interface in accordance with the input specification, exclusively the at least one output signal in accordance with the output specification on the output interface. In other words, the functional module is tested or checked for specification compliance on the basis of the input specification and the output specification independently of the installation. If at least one output value of the at least one output signal violates the output specification, the analysis device signals a module error. The module error thus indicates that the functional module is not operating in compliance with the specification.

The invention results in the advantage that the analysis device can be used for a functional module in a dry run, that is to say without actually being operated in the installation, to establish whether the input specification and the output specification describe the functional module correctly. It is thus sufficient, then, to match the input specification and the output specification with an installation configuration of installation components of the installation that interchange the at least one input signal and the at least one output signal with the functional module. From this, it is possible to tell whether the installation, on the one hand, and the functional module, on the other, are compatible with one another. The described check on the functional module is subsequently also referred to as function verification.

In one advantageous development of the invention, the analysis device uses a functional program of the functional module, that is to say a computer-readable description of the function of the functional module, to form a module model. The functional program describes how the at least one input signal is used to form the at least one output signal. The functional program may be e.g. a program text for an FPGA (field programmable gate array) or ASIC (application-specific integrated circuit) or a PLC.

The module model therefore reproduces a module behavior of the functional module on the output interface. The analysis device takes the module model as a basis for using a model check (model checking) to check the at least one output signal for its compliance with the output specification. Methods of model checking are known per se from the prior art. An example thereof is model checking on the basis of an SMT (satisfiability modulo theories) solver. Formation of a module model and use of a model check result in the advantage that the check on the output specification can be performed mathematically completely. This is possible only with a very high level of complexity or even not at all based on a simulation, for example.

In one development of the invention, a program code text, that is to say at least one file that contains said functional program of the functional module, and the input specification and the output specification, together, are used to produce a digital certificate. This results in the advantage that it is easily possible to demonstrate to a third party and/or also at a later time that a particular functional module fulfills a particular input specification and a particular output specification. This can easily be checked by virtue of the input specification, the program code text and the output specification being combined a further time to produce a second digital certificate, and the original certificate and the further certificate being compared.

In one development of the invention, the functional module is not provided alone in the installation, but rather the input specification and the output specification together with the functional module are also provided as an extended functional module in the installation. This results in the advantage that when planning or configuring or parameterizing the installation, the addition of the functional module to the installation on the basis of the input specification and the output specification can be preceded by an automated check being performed on the compatibility of the functional module with respect to the specific and/or current installation configuration.

In order to allow this automated check on the functional module, a suitable notation for the input specification and the output specification is needed. To this end, one advantageous development of the invention provides for the input specification and/or the output specification each to be provided as a predicate logic. An example of a specification in the form of a predicate logic is: speed≥0. This states that the input signal "speed" cannot have input values that are negative. The use of a predicate logic has the advantage that assumptions and assertions that have been made by a developer when developing a functional module can be converted directly into machine-readable specifications. It is particularly advantageous if a first-order predicate logic and/or a quantifier-free predicate logic is used. This advantageously simplifies the check on the input specification and/or the output specification drastically. A higher-order predicate logic and/or a predicate logic with a quantifier would, for example, contain the statement: "There is a speed input value that results in a speed output value greater than zero". Such an "existence quantifier" can be checked in automated fashion only inadequately.

In one preferred development of the invention, the module error described is not simply just signaled as being that the functional module violates the specifications, but rather a counterexample is output that indicates for the at least one input signal the respective input value that yields the at least one output value that violates the output specification. This results in the advantage that it is possible to systematically search for the underlying error in the functional module.

In one development of the invention, the analysis device additionally checks whether the at least one input signal that is produced by the installation on the input interface fulfills the input specifications. In other words, the input specifications are thus regarded here not as prerequisites or assumptions from which the functional module sets out, but rather as assertions or conditions that the installation needs to meet in order for the at least one input signal to be produced correctly on the input interface for operation of the functional module in the installation. If at least one input value of the at least one input signal produced by the installation violates the input specification, incorrect use of the functional module is signaled. In other words, it is signaled that the installation does not produce the at least one input signal correctly, which means that the functional module thus cannot be used as intended in the installation. This results in the advantage that it is possible to detect when the installation is configured incorrectly for operation of the functional module.

In this regard, one development provides for that installation state in which the at least one input value violating the input specification is produced by the automation installation to be signaled. This results in the advantage that the error can be ascertained in the installation in targeted fashion.

In order to ascertain all possible input values that the installation can potentially produce as completely as possible, one development of the invention provides for the analysis device to take an installation configuration of installation components of the installation as a basis for forming an installation model. The installation configuration of installation components of the installation describes those parameter values and/or configuration values and/or programmings of the installation components that describe the installation behavior of the installation with respect to the input interface. Said installation model accordingly reproduces the installation behavior on the input interface. The incorrect use is accordingly ascertained by means of a model check. As already described in connection with the model check for the functional module, this allows the observance of the input specification by the installation on the input interface to be checked in mathematically complete fashion. Another term for installation configuration is also installation planning.

The described check on the installation is subsequently also referred to as environment verification for the functional module.

The invention also includes an engineering system for configuring or planning an installation for process automation. An engineering system can have one or more processor devices, for example computer workstations, and be connected to the installation, by way of example, by means of a communication network for example an IP-based network (IP—Internet protocol) and/or a field bus. The engineering system according to the invention has an analysis device, for example a program module, that is set up to perform an embodiment of the method according to the invention. The engineering system according to the invention has the advantage that it can be used to check a functional module for its compatibility with the installation prior to addition to the installation, for example prior to storage of the functional module in a programmable logic controller or prior to connection of the functional module, initially on the basis of the input specification and the output specification. This allows errors to be prevented during operation of the installation.

BRIEF DESCRIPTION OF THE DRAWING

An exemplary embodiment of the invention is described below. In this regard.

DETAILED DESCRIPTION OF PREFERRED EMBODIMENTS

The exemplary embodiment explained below is a preferred embodiment of the invention. In the exemplary embodiment, the described components of the embodiment each represent individual features of the invention that can be regarded independently of one another and that each also develop the invention independently of one another and hence can also be regarded as part of the invention individually or in a combination other than that shown, however. Furthermore, the embodiment described can also be augmented by further instances of the already described features of the invention.

In the figures, elements having the same function are each provided with the same reference symbols.

Figure 1:
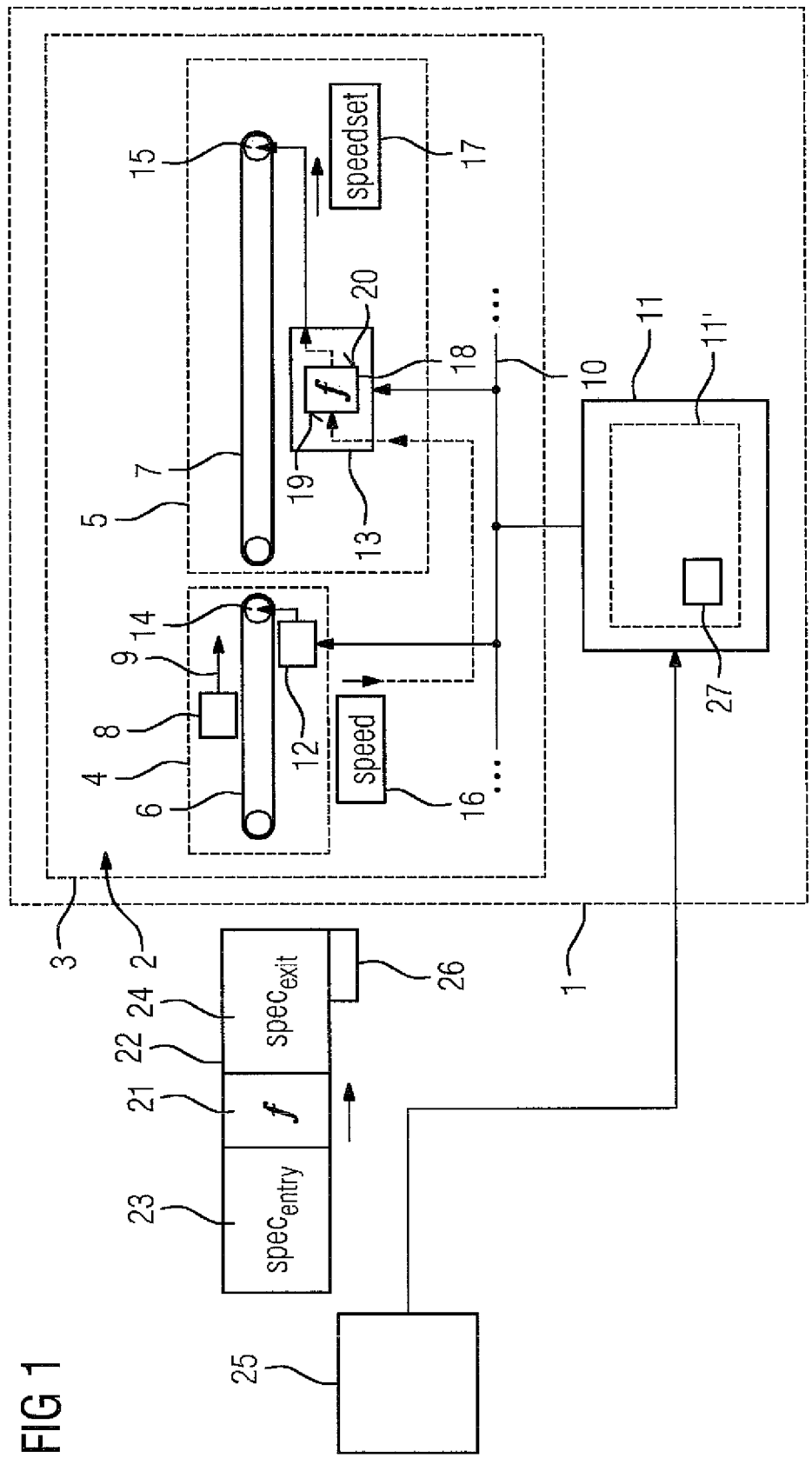
FIG. 1 shows a schematic depiction of an embodiment of the engineering system according to the invention.

FIG. 1 shows an installation 1, which may be a production installation or a process control installation or a signal control installation, for example. A manufacturing installation may be provided, by way of example, for manufacturing a product, for example motor vehicles. A process control installation may be provided, by way of example, for regulating or controlling a method cycle, for example for generating electric power from nuclear power. A signal control installation may be provided, by way of example, for controlling a traffic light system in a city quarter.

The installation 1 can have one or more installation components 4, 5, only the two installation components 4, 5 of which are depicted in FIG. 1 by way of example, for regulating and/or controlling a process 2 in an area 3, for example an industrial building or the cited city quarter. By way of example, the installation components 4, 5 can each have a conveyor belt 6, 7 by means of which a piece good 8 is intended to be conveyed along a conveying direction 9 at a predetermined speed. In the example shown, the piece good 8 is initially conveyed by the conveyor belt 6 and subsequently transferred to the conveyor belt 7, which conveys the piece good 8 onward. The installation components 4, 5 may be coupled in the installation 1 by means of a communication device 10, for example a field bus, such as a PROFINET bus, for example. The communication device 10 can be used by the installation components 4, 5 and also by the further installation components, not depicted, to interchange communication data.

The installation 1 can moreover have an engineering system 11 that can configure or parameterize or plan the installation components 4, 5.

By way of example, each installation component 4, 5 can have a respective programmable logic controller 12, 13. By way of example, in the case of the conveyor belt 6, the controller 12 can regulate or control a drive motor 14, so that the conveyor belt 6 transports or conveys the piece good 8 at a prescribed conveying speed. The controller 13 can likewise control a drive 15 for the conveyor belt 7, for example, so that the piece good 8 is conveyed or transported on the conveyor belt 7 at a prescribed conveying speed.

So that the controller 13 controls the installation component 5 in the installation 1 in the required manner in order to perform the process in the installation 1, there may be provision for the installation component 5 to be operated in coordination with the installation component 4 so that the conveying speeds of the conveyor belts 6, 7 are the same, for example. To this end, the installation component 4, for example, particularly the controller 12, can transmit a status signal 16 to the controller 13, for example by means of the communication device 10. By way of example, the status signal 16 may be a speed signal with respective current speed values for the conveyor belt 6.

The controller 13 can have a functional module 18 that can produce a control signal 17 for the drive 15 on the basis of the status signal 16 of the controller 12. The functional module 18 may be a program module of the controller 13, for example. The functional module 18 may be a circuit or a plug-in card with a programmable processor, for example. The control signal 17 is an output signal from the functional module 18. The control signal 17 may be e.g. a speed setting signal speedset for the drive 15. The functional module 18 can receive the status signal 16 of the controller 12 for example by means of the communication device 10. The status signal 16 is therefore an input signal.

The input signal can be received by the functional module 18 on an input interface 19. On the input interface 19, signal transfer for the input signal to the functional module 18 is prescribed in a predetermined manner. On the basis of the input signal or multiple input signals, the functional module 18 can produce the control signal 17 as an output signal. The functional module 18 can provide the output signal and possible further output signals on an output interface 20. On the output interface 20, the output signal can be received by the controller 13 and, by way of example, transmitted to the drive 15.

In the example, there is provision for the engineering system 11 to be used to reconfigure the programmable logic controller 13. In the controller 13, the functional module 18 is intended to be replaced by a new functional module 21. Alternatively, there may also be provision for the installation 1 to be in a new state and for the controller 13 to be intended to be provided with a new functional module 21 for the first time, that is to say for a functional module 21 to be intended to be provided in the controller 13. In this case, it is necessary to ensure that the functional module 21 has only input signals that the functional module 21 can actually process applied to it on the input interface 19. Furthermore, it is necessary to ensure that the functional module 21 produces output signals on the output interface 20 that result in the desired behavior of the installation component 5 in the installation.

In connection with the explanation of the invention below, it is important for the engineering system 11 to be able to have an analysis device 11' that can perform an embodiment of the method according to the invention. The analysis device 11' may be e.g. a program module of a processor device of the engineering system 11.

The functional module 21 is provided not alone but rather as an extended functional module 22 that, in addition to the functional module 21, also comprises an input specification 23 and an output specification 24. The extended functional module 22 may be provided by an external developer or manufacturer 25, for example, that supplies the installation operator of the installation 21 with the extended functional module 22. Before the functional module 21 is used or provided in the controller 13, the analysis device 11' of the engineering system 11 can perform a check on the functional module 21 on the basis of the input specification 23 and the output specification 24, since the extended functional module 22 contains all the required information.

Additionally, there may be provision for the extended functional module 22 to be provided with a certificate 26 that may be formed on the basis of the input specification 23, the output specification 24 and a program text of the functional module 21. By way of example, a hash function can be used to produce the certificate 26. Furthermore, the certificate 26 confirms that for the input specification 23 the functional module 21 fulfills the output specification 24. The certificate 26 can be used in the engineering system 11 in automated form, that is to say without action by a user, by recomputing the digital certificate, to ascertain whether the program text of the functional module 21 is identical to that which has been used by the manufacturer 25 to check the output specification 24 with the proviso of the input specification 23.

The engineering system 11 can comprise a model check 27 that can check the extended functional module 22 in two respects. It is possible for the functional module 21 itself to be verified with regard to the output specification 24 on the assumption that there are merely input signals in accordance with the input specification 23. Furthermore, it is possible to check whether the installation 1 produces, on the input interface 19, only such input signals as also result in input values in accordance with the input specification 23.

In this regard, the text below refers to FIG. 2, FIG. 3 and FIG. 4. FIG. 3 shows once again how the functional module 21 has been extended on its input interface 19 by the input specification 23 and the functional module 21 has been extended on its output interface 20 by the output specification 24.

Input and output specifications can be regarded as assumptions and assertions, the input specification being interpreted as an assumption or as an assertion depending on the verification problem (reusability/function verification or environment verification), the output specification being classified as an assertion, or being avoided.

Figure 3:
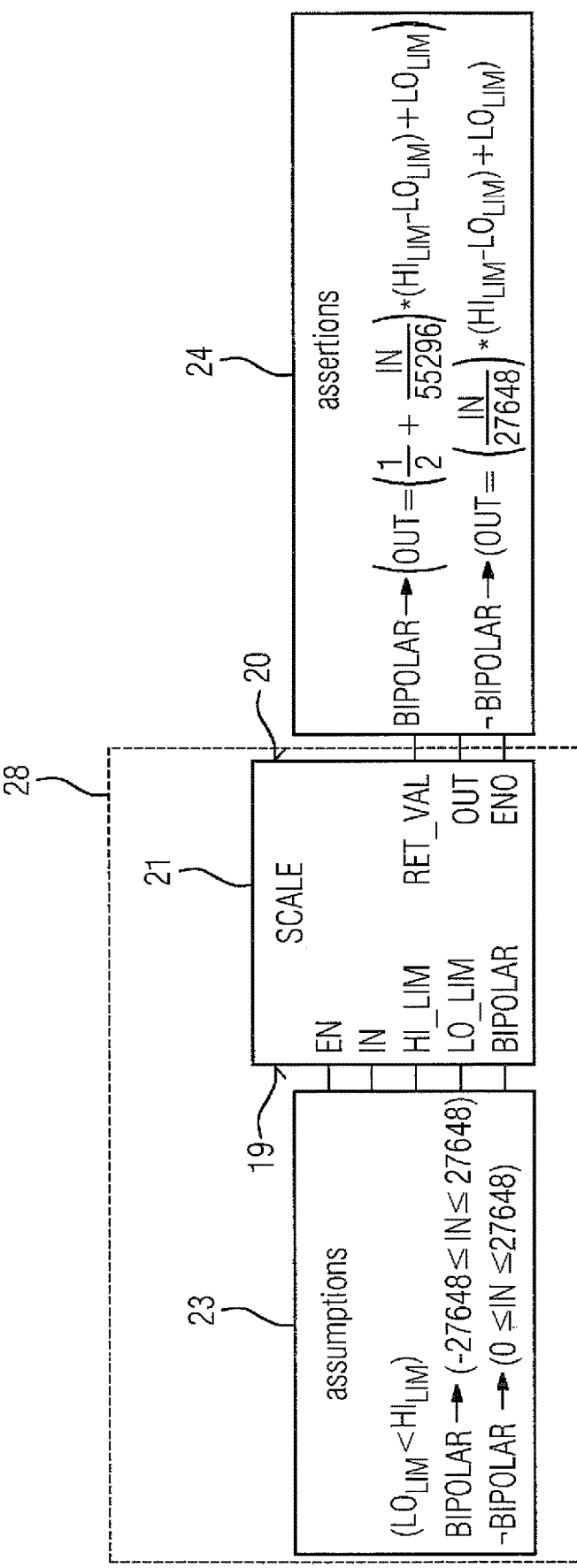
FIG. 3 shows the extended functional module from FIG. 2 as can be used in the engineering system for function verification of a functional program of the functional module.

FIG. 3 illustrates how the input specifications 23 are treated as assumptions and the output specifications 24 are treated as assertions in order to verify the functionality of the functional module 21.

Figure 4:
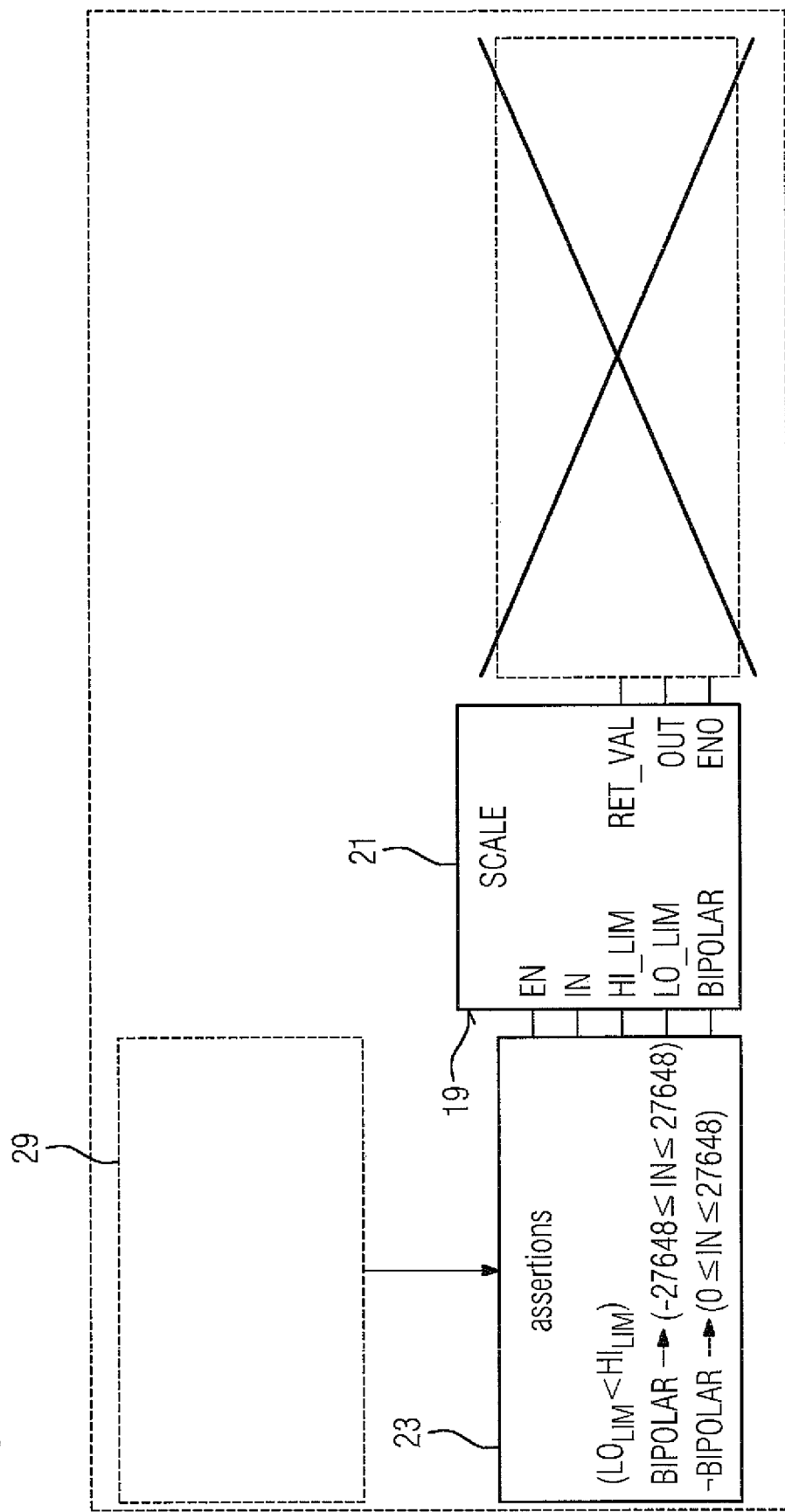
FIG. 4 shows the extended functional module in the form as can be used for environment verification in the installation.

FIG. 4 illustrates how the input specification 23 is taken as a basis as an assertion in order to verify the installation behavior, that is to say to perform an environment verification for the functional module 21.

Formal checking techniques (e.g. the model check 27) can be used to substantiate the validity of the result assumptions and assertions on the basis of the functional code of the functional module 21. If the check fails, counterexamples can be provided that describe a violation of the connected functional specifications.

The input specification 23 and the output specification 24 can each comprise quantifier-free first-order formulas (QF) that can be appended to the functional module 21. This can be at any desired position for the functional module. An example of such a QF formula is for a speed parameter speed$\geq$0. The assertions and assumptions are both QF formulas, which differ in their interpretation, however:

Assertion: It is an error if it is possible to make an assertion, during execution of a PLC program, that violates the QF formula by the current values of the parameter, that is to say of a program variable. For example, an error report is displayed if the assertion speed<0 can be made by means of a negative value in the speed variable.

Assumption: On the other hand, only a functional module that is extended by an assumption speed$\geq$0 is analyzed for the non-negative values of the speed variable. The possibility of the speed indicating a negative value is ignored, since it violates the assumption. Therefore, the negative value of an input value speed is filtered out instead of being reported as an error.

Assertions and assumptions are dual: Assertions formalize a condition that needs to be satisfied, provided that all assumptions are satisfied. Assumptions are a restriction of the variable values, in the manner in which a programmer interprets the input values.

It is therefore possible for an extended functional module to be defined as a "triple" (specentry, f, specexit), where f is the code (e.g. in any automatic IEC 61131-3-compliant program languages) and the signature of the function (or of the functional module), and specentry is an input specification and specexit is an output specification. Specentry and specexit are both each QF formulas.

Figure 2:
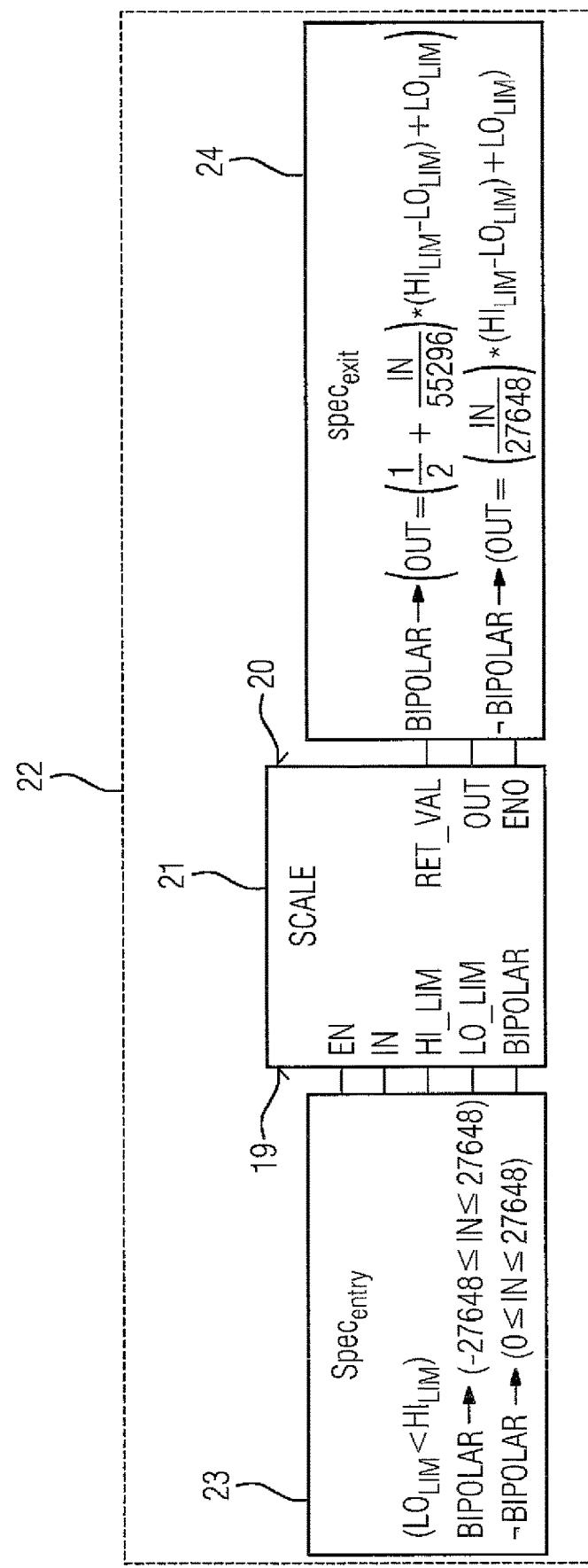
FIG. 2 shows an outline for an extended functional module, as can be provided by an embodiment of the method according to the invention.

An example of the extended functional module 22 is shown in FIG. 2. It explains essential input and output specifications 23, 24 for a function SCALE, which, as functional module 21, may be part of a standard library for a PLC. Essentially, the input specification 23 explains that SCALE has been developed on the assumption that the input value IN is within the range [0,27648] for unipolar inputs and in [−27648, −27648] for bipolar inputs and that the real-value range is reliably defined by the inputs LOLIM and HILIM (e.g. LOLIM HILIM). On these assumptions, SCALE is guaranteed to produce an output value OUT that is the result of the scaling from the input IN in accordance with the polarity and the output range [LOLIM, HILIM].

On the basis of the aforementioned definitions, it is possible to provide a solution for checking the functional module 21. A fundamental aspect of the solution is the interpretation of the input and output specifications of the extended functional module 22. Depending on the problem (reusability or function verification or environment verification), they need to be regarded as assumptions and assertions and checked.

The techniques and methods for the formal check on the functional module 21 enriched with assumptions and assertions are not fundamental. They can be chosen and applied by a person skilled in the art, e.g. according to aspects of efficiency. A method that affords the required techniques is e.g. model checking.

Reusability addresses the development of reusable functional modules 21. During development, the functional module 21 is extended by the input specification 23, which cites assumptions and prerequisites about its future use. This is shown by the following examples:

During development of stoppage detection, it will be possible to add the input specification speed≥0.

In the SCALE example in FIG. 2, the input specification formalizes the admissible ranges for the IN parameter, depending on the polarity.

In the example of the conveyor belt 7, it will be possible to use an input specification|precedingspeed−currentspeed|<σ in order to express a restriction of the control algorithms that are executed within the functional module 21 in order to express that speed fluctuations must not exceed the threshold value σ.

The input specification 23 becomes part of the extended functional module 22 and is used in the process engineering system (e.g. the engineering system 11 or by the manufacturer 25). They are used by the user as precise documentation of the scheduled use of the function.

Function verification addresses the guarantee that a manufacturer provides for correct behavior by the functional module 21. This can be eased by adding the output specification 24 and using formal methods (e.g. the aforementioned model checking) in order to automatically substantiate the correctness of the output specification 24 modulo the input specification 23, that is to say for given input conditions:

For the aforementioned functional module SCALE, the output specification 24 explains that the OUT parameters correspond to the correctly scaled input IN, provided that the input specification 23 is observed.

For stoppage detection, an output specification speedmin speedset speedmax at the end of the functional module 21 on the conveyor belt expresses that after execution of the functional module 21 the speed of the connected drive 15 has a value between speedmin and speedmax, speedmin and speedmax corresponding to the hardware specification of the drive. The output value speedset is meant to be an output value of the output signal 17.

Use of the input and output specifications 23, 24 allows the problem of verification to be solved automatically: once the developing engineer has extended the functional module 21 by input and output specifications 23, 24, it is possible e.g. for a method of model checking to be used by a model checker 27 in order to substantiate the correctness of the output specifications 24 on the assumption that the input specification 23 is fulfilled. This works as follows:

1. All input specifications are regarded as assumptions.
2. All output specifications are regarded as assertions.
3. The functional code of the functional module 21 is supplied to the model checker 27 together with the assumptions and assertions.

If the model checker was successful, this is mathematical evidence that the functional module 21 behaves, by means of the output specifications 24, as described so long as it is used in coordination with the input specifications 23. If the engineering system 11 thus has a model checker 27, it is then automatically possible for the correctness of the output specifications 24 to be substantiated repeatedly. In this way, the evidence of correctness can be automatically repeated by the user in order to substantiate the correctness of the functional code of the functional module 21 that he has e.g. purchased or acquired.

FIG. 3 shows the functional module SCALE, in which the input specifications 23 are interpreted as assumptions and the output specifications 24 are interpreted as assertions. This module model 28 formed in this way is transferred to the model checker 27, which demonstrates that the output specifications 24 (i.e. the assertions) are fulfilled by virtue of the functional module 21 being executed and, in the process, all input specifications 23 (i.e. assertions) being fulfilled.

A function verification can therefore be provided as follows:

The developer can clearly name the assumptions that he makes during code development (input specifications 23).

The developer can clearly name the code behavior that he develops (output specifications 24).

A model checker with the manufacturer 25 allows the developer to prove the correctness of the functional code before it is delivered to the users.

The developer can deliver the extended functional module 22 to those users that absolutely rely on the output specifications 24. Moreover, the users can use a model checker 27 itself to substantiate the product specification (input and output specifications 23, 24) of the developer using the functional code.

Digitally signed certificates 26 from a successful check on the output specifications 24 can be provided automatically, which proves the correctness to the users.

An environment check or environment verification takes into consideration the use of an extended functional module 22 by a user within a specific project, i.e. within a prescribed installation 1. As described, the output and input specifications 23, 24 allow the user to substantiate the correctness of the functional code that he has acquired or purchased. What is still absent from the environment check is how the user can substantiate that he is using the purchased or acquired functional module 21 in his installation 1 correctly, i.e. only or exclusively input signals in accordance with the input specification 23 are produced by the installation on the input interface 19.

This can be performed in automated fashion as follows (e.g. by means of the engineering system 27). No user is needed:
1. The input specifications 23 of the functional module 21 are interpreted as assertions.
2. All output specifications can be removed.
3. The project of the user (i.e. the installation configuration or installation specification) is transferred to the model checker 27 as an installation model 29 together with the extended functional module 22 in order to check that the surrounded code never violates the input specifications 23. Since this can be fully automated in the model check 27, the user requires no background knowledge concerning the formal substantiation.

Every input specification 23 that is violated corresponds to an unscheduled use of the acquired extended functional module 22 and is reported as an erroneous substantiation pass or incorrect use. In this case, the model checker 27 can signal a counterexample that describes a pass that results in a violation of the input specification 23 of the functional module. In this way, the environment verification also assists the user in detecting incorrect use of an extended functional module 22. The following examples illustrate this:
1. The input specification speed≥0 of the functional module for stoppage detection is converted into an assertion and the output specification speedmin speedset speedmax is removed. Subsequently, the complete user project is checked by using the function of stoppage detection in this way. This tallies with the evidence that the stoppage function receives only non negative speed values speed from the installation. If the function is not used correctly, the model checker 27 produces a counterexample that describes the incorrect use of a stoppage detection code, e.g. a call with a negative value in the speed parameter.
2. The extended version of the SCALE function is illustrated once again in FIG. 4: the input specification 23 is converted into an assumption, while the output specification 24 is removed. It is now possible to substantiate for the installation component 13 that uses the SCALE function that the input parameters are produced correctly.

The input specification 23 and the output specification 24 are preferably formulated as a predicate logic. Applying a quantifier-free predicate logic (FO formula) for the variables allows input and output specifications to be defined for a functional module in order to stipulate:
1) the functional module behavior and
2) the prerequisites that need to be met for the remaining PLC program (i.e. the environment) so that the functional module works correctly.

Use of the FO formulas for specifying the interface of the functional module with the remaining PLC program allows methods of model checking to be used (e.g. connected model checks or the counterexample-led extraction) in order to automatically substantiate the validity of the interface.

Methods that speed up the fundamental substantiation process are not fundamental to the invention disclosure, however; they can be selected by a person skilled in the art as required from the methods available in the prior art. Instead, the described method points to using a model check and the definition of input and output specifications in order to describe the interfaces and the behavior of a functional module.

Application options for an input and output specification in order to formalize the interface of the functional module are as follows, in particular:
1. During the development of a reusable function, input specifications are used in order to restrict the inputs, so that the function works as expected (e.g. admissible speed, voltage or temperature ranges). The behavior that the function needs to keep to is specified by an output specification at the end of the function, as a result of which the applied input is connected to the expected output. In this way, the output specifications specify the effect when the function is carried out and formalize its behavior.

By contrast, finding and naming an input and output specification today is accomplished by virtue of the documentation (i.e. a manual) for the function being written. By contrast, the method described provides the input and output specifications in a machine-readable fashion and therefore allows automatic verification.
2. The developer can then substantiate the validity of his own product description: to this end, he operates a model checker that proves or refutes the assertions that he has made regarding the behavior of the functional module. This step is fully automated. If it is possible to find fault with an assertion, the model checker reports an applicable counterexample. Otherwise, the proof is successful and the function is guaranteed to behave in accordance with the specification (e.g. expressed as assertions) so long as the assumptions with the admissible input values are implemented by the surrounded code.
3. The extended function 22 is delivered to the user, that is to say to the user of the installation 1 in the example.
4. The user can use the input and output specifications of the functions obtained in two ways:
   a. in order to substantiate that the function that he has acquired is completely correct. This is essential for the know-how of the protected functions for which the user has no access to the current source code.
   b. in order to check that the function is used correctly in the specific installation, e.g. that all parameter values transferred to the function correspond to the input specifications of the functions.

Overall, the example shows how the invention can provide a method and a system for extending and verifying particularly IEC61131 functions using interface specifications.

What is claimed is:
1. A method for checking a compatibility of a functional module for operation in an installation for process automation, said method comprising:
receiving via an input interface of the functional module an input signal from the installation, said input signal comprising an operating parameter of the installation,
producing with the functional module an output signal based on the input signal,
outputting the output signal to the installation via an output interface of the functional module, said output signal causing a desired behavior of the installation, providing for the input interface an input specification as a first-order predicate logic or a quantifier-free predicate logic, which specifies for the input signal all input signal values deemed to be valid for the functional module, providing for the output interface an output specification as a first-order predicate logic or a quantifier-free predicate logic, which specifies for the output signal all output signal values supplied by the functional module when the input specification is fulfilled, and before the functional module is operated in the installation, checking by an analysis device whether the functional module produces, for an input signal produced by the installation on the input interface in accordance with the input specification, the output signal on the output interface exclusively in accordance with the output specification, and, when at least one output value of the output signal violates the output specification, signaling an incorrect use of the functional module and providing a counterexample that indicates for the input signal the respective input value that yields the output value that violates the output specification and presenting the counterexample to a user to assist the user in detecting incorrect use of the functional module.

2. The method of claim 1, further comprising signaling the incorrect use by signaling that a state of the installation in which the input value violating the input specification is produced by the installation.

3. The method of claim 1, further comprising forming with the analysis device, based on an installation configuration of installation components of the installation, an installation model that reproduces an installation behavior on the input interface, and ascertaining the incorrect use on the basis of the installation model by means of a model check.

4. An engineering system for configuring an installation for process automation, said engineering system comprising:

a functional module configured to receive via an input interface of the functional module an input signal from the installation, said input signal comprising an operating parameter of the installation, produce with the functional module an output signal based on the input signal, output the output signal to the installation via an output interface of the functional module, said output signal causing a desired behavior of the installation, provide for the input interface an input specification as a first-order predicate logic or a quantifier-free predicate logic, which specifies for the input signal all input signal values deemed to be valid for the functional module, and provide for the output interface an output specification as a first-order predicate logic or a quantifier-free predicate logic, which specifies for the output signal all output signal values supplied by the functional module when the input specification is fulfilled, and an analysis device configured to before the functional module is operated in the installation, check whether the functional module produces, for an input signal provided by the installation on the input interface in accordance with the input specification, the output signal on the output interface exclusively in accordance with the output specification, and, when at least one output value of the output signal violates the output specification, signal an incorrect use of the functional module and provide a counterexample that indicates for the input signal the respective input value that yields the output value that violates the output specification and present the counterexample to a user to assist the user in detecting incorrect use of the functional module.

* * * * *